Nov. 18, 1958 J. L. RENNICK 2,861,210

IMAGE REPRODUCING SYSTEM

Filed May 27, 1954 3 Sheets-Sheet 1

JOHN L. RENNICK
*INVENTOR.*

BY Francis W. Crotty

HIS ATTORNEY.

Nov. 18, 1958 J. L. RENNICK 2,861,210

IMAGE REPRODUCING SYSTEM

Filed May 27, 1954 3 Sheets-Sheet 2

JOHN L. RENNICK
*INVENTOR.*

BY Francis W. Crotty

HIS ATTORNEY

JOHN L. RENNICK
*INVENTOR.*

BY Francis W. Crotty

HIS ATTORNEY.

United States Patent Office 2,861,210
Patented Nov. 18, 1958

2,861,210

IMAGE REPRODUCING SYSTEM

John L. Rennick, Elmwood Park, Ill., assignor to Zenith Radio Corporation, a corporation of Delaware Application May 27, 1954, Serial No. 432,732

7 Claims. (Cl. 313—92)

This invention pertains to a new and improved television image reproducer and is particularly concerned with the reduction and elimination of moiré patterns in the reproduced image. The invention is of particular value as applied to a color image reproducer and will be described in that environment.

Several different types of apparatus have been developed for the reproduction of television images in simulated natural color. One such image reproducer, for example, comprises a target structure including a multiplicity of target strips interspersed throughout the target area in a predetermined pattern. The elemental target areas preferably comprise three different groups, each group having a different color radiation characteristic in response to electron bombardment; for example, the target strips may comprise three different phosphors which emit light corresponding to the additive primary colors red, blue and green respectively. A color-selection barrier is interposed between the target and the single electron gun of the tube to permit selective excitation of the different target area groups as desired. This color-selection barrier may comprise two electrically insulated grids, the conductive elements of the two grids being interspersed with one another and extending parallel to the target area strips; color selection is achieved by varying the relative voltages of the two barrier grids with respect to one another. A somewhat similar image reproducer employs a strip-type screen and a single grid of conductive elements extending parallel to the screen. In this second type of image reproducer, three effective electron beam sources are employed and color selection is achieved in accordance with the effective angle of incidence of the individual beams with respect to the target-barrier structure. In either of these image reproducers, the color-selection barrier may be operated at a substantially different potential from the target so that the electron beam or beams are subjected to an electrostatic focusing lens field as they pass through the barrier to impinge upon the target.

In many of the wide variety of image reproducers such as those described above, moiré or beat patterns present a distinct problem and tend to reduce the quality of the reproduced image. These moiré patterns may become so pronounced as to render the reproduced image completely unacceptable.

It is an object of the invention, therefore to provide a new and improved television image reproducer in which moiré patterns are effectively minimized.

It is a more specific object of the invention to provide a new and improved color television image reproducer in which the component structures are of practical size and in which moiré or beat patterns are avoided without requiring additional elements or circuits.

A television image reproducer of the type in which an electron beam is deflected across a luminescent target in an image raster of a predetermined number of scanning lines comprises, in accordance with the invention, a luminescent target and means including an electron gun for generating and projecting a beam of electrons to bombard that target. A barrier comprising a multiplicity of elements is disposed intermediate the luminescent target and the electron gun in spaced relation to the target; these barrier elements are required to have a predetermined pitch equal to the sum of the pitch of the scanning lines at the barrier and the width of the barrier elements.

The features of the invention which are believed to be novel are set forth with particularity in the appended claims. The organization and manner of operation of the invention, together with further objects and advantages thereof, may best be understood by reference to the following description taken in conjunction with the accompanying drawings, in which like reference numerals refer to like elements in the several figures and in which:

Figures 1, 2, 3:
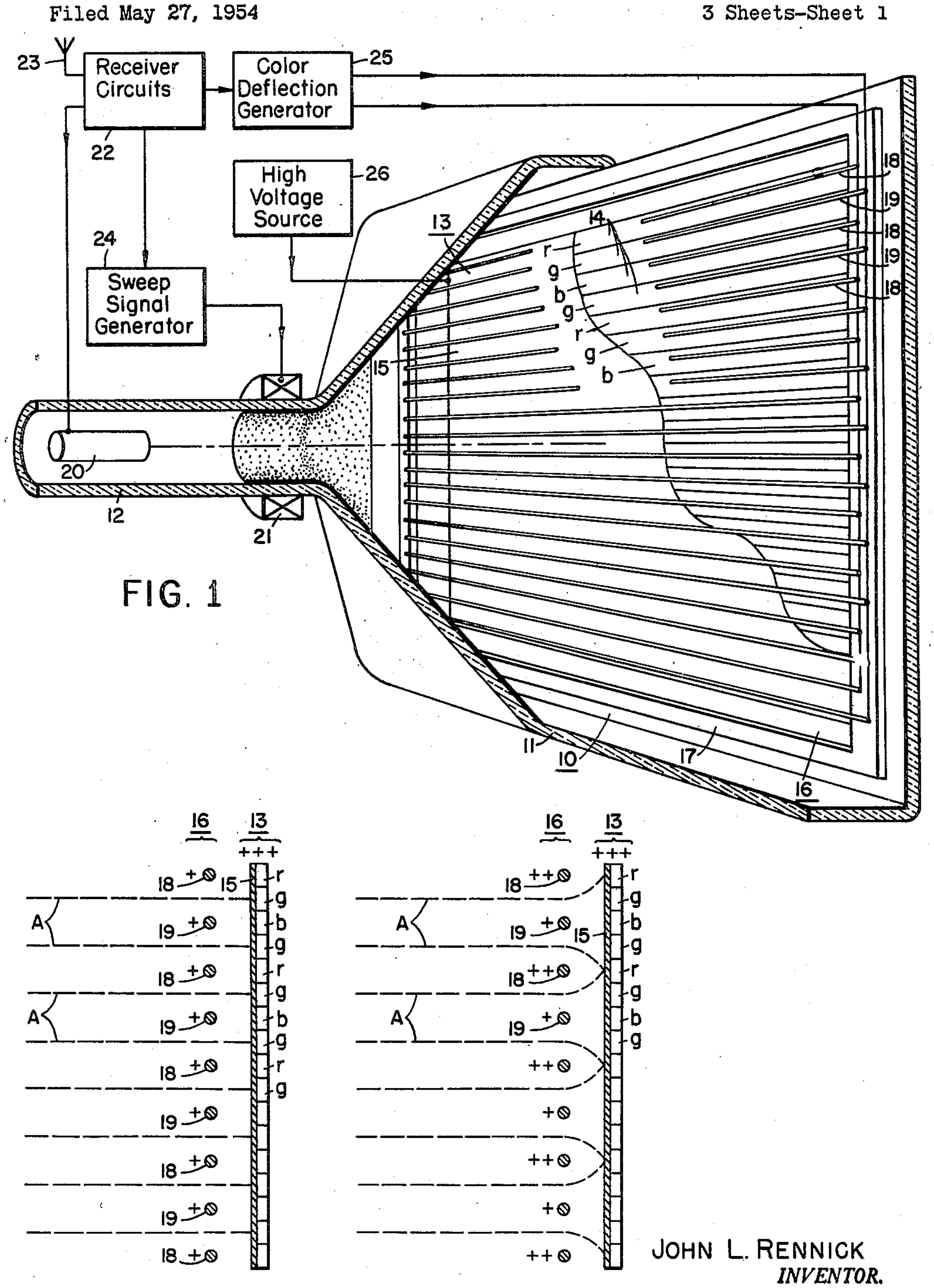
Figure 1 is a cutaway view of one type of television image reproducer to which the invention may be applied, and includes a block diagram of certain television receiver circuits.
Figures 2 and 3 are illustrative diagrams employed to describe the operation of the tube shown in Figure 1.

The apparatus illustrated in Figure 1 comprises a color television image reproducer 10 including an envelope having a bulb section 11 and a neck section 12. A target 13 is mounted at the end of bulb section 11 opposite neck section 12; target 13 includes a multiplicity of elemental target areas 14 extending horizontally across the face of tube 10. Elemental target areas 14 comprise three different target area groups *r*, *g* and *b* each having a different color radiation characteristic in response to electron bombardment; for example, group *r* may emit light corresponding to the additive primary color red when subjected to electron bombardment, whereas groups *g* and *b* may emit green and blue light respectively. The choice and number of primary color groups employed is a matter of design selection; the invention is equally applicable to image reproducers based on two, or four or more, primary colors. Preferably, the surface of target 13 facing neck section 12 is covered with a thin conductive film 15, a portion of which has been cut away to expose the target areas 14; film 15 may be formed from aluminum or any other suitable conductor.

Tube 10 further includes a color-selection barrier 16 comprising a supporting frame 17, a first series of conductive elements or grid wires 18, and a second series of grid wires 19 regularly interspersed in alternation with conductive elements 18. Grid wires 18 are electrically interconnected with each other but are insulated from grid wires 19, the latter group also being interconnected. Conductive elements 18 and 19 of color-selection barrier 16 are disposed in predetermined spaced relationship to color target 13 and are arranged in a regular pattern extending parallel to the pattern of color strips 14.

An electron gun 20 is mounted within neck section 12 of image reproducer 10 and may be of any conventional construction adapted to develop and project a beam of electrons through color-selection barrier 16 to bombard target 13. A deflection yoke 21, which may also be of conventional construction, is mounted on neck section 12 intermediate gun 20 and barrier 16; of course, an electrostatic deflection system may be employed if preferred. Electron gun 20 is coupled to conventional receiver circuits 22; receiver circuits 22 may include such amplifier, detector, and other circuits as are necessary to derive brightness, color, and scanning control signals from a telecast received at antenna 23, which is coupled to unit 22. Receiver circuits 22 are also coupled to a sweep-signal generator 24 which, in turn, is connected to deflection system 21. In addition, receiver circuits 22 are coupled to a color deflection signal generator 25 which is individually coupled to colors-election grids 18 and 19. A high voltage source 26 is connected to conductive film 15 of color target 13.

It will be recognized that the apparatus of Figure 1, as thus far described, constitutes an extremely simplified representation of a conventional type of color television image reproducer and associated circuitry. A color television signal received at antenna 23 is demodulated, amplified, and detected in receiver circuits 22 to develop a video signal, scanning synchronization signals, and color synchronizing signals. The video signal is applied to electron gun 20 to modulate the intensity of an electron beam developed by the gun and projected through color-selection barrier 16 to bombard target 13. The scanning synchronization signals are applied to generator 24, which generates suitable deflection control signals and applies those deflection control signals to system 21 to deflect the electron beam across target 13 in a raster comprising a predetermined number of scanning lines (525 lines per frame according to present standards). The color synchronizing signals are supplied to color deflection generator 25 wherein they are employed to develop color deflection signals which are supplied to grids 18 and 19 of color-selection barrier 16 to control the color content of the reproduced image.

The operation of the composite barrier-target structure of tube 10 is more clearly illustrated in Figures 2 and 3, in which only portions of target 13 and color-selection barrier 16 are shown in schematic cross section. As indicated in Figure 2, grids 18 and 19 of barrier 16 are preferably operated at a substantially lower potential than target 13 so that the electron beam is subjected to an electrostatic focusing lens field as it traverses the space between the color-selection barrier and the color target. In Figure 2, grids 18 and 19 are maintained at the same potential so that the electron beam, illustrated in several positions by dash lines A, is not deflected but passes through color-selection barrier 16 to impinge upon the target areas of group *g*, which are centered with respect to each pair of adjacent conductive elements 18, 19. In Figure 3, on the other hand, the elements of grid 18 are made substantially positive with respect to grid 19 so that the electron beam is deflected to impinge upon the target areas of group *r*. Of course, if the relative polarities of grids 18 and 19, as shown in Figure 3, are reversed, the electron beam is deflected in the opposite direction so that it impinges only upon target area groups *b*. The color switching action illustrated in Figures 2 and 3 is controlled by means of color deflection signals from generator 25 (Figure 1) in known fashion; a more detailed description of the operation of this particular type of image reproducer may be obtained by reference to the article entitled "Compatible Color Picture Presentation With the Single Gun Tri-Color Chromatron" published in "Proceedings of the IRE," January 1945, pages 308–314, so that an extensive discussion of the tube is unnecessary here.

Figure 4:
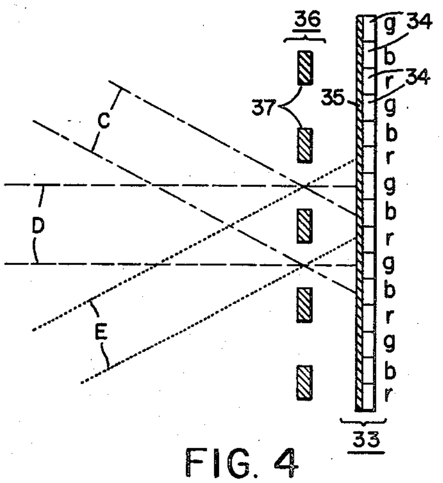
Figure 4 is an explanatory diagram illustrating the operation of a different type of television image reproducer to which the invention may be applied.

Figure 4 is a cross-sectional view of a portion of the barrier-target structure of a color television image reproducer which is in many respects similar to that of the picture tube of Figures 1–3. In Figure 4, the target 33 comprises a multiplicity of target area strips 34 which, as in tube 10 of Figure 1, extend in the line-scanning direction across the face of the image reproducer. Target areas 34 may include phosphors from three different groups *r*, *g* and *b* which emit light corresponding to the primary additive colors red, green and blue respectively. In the apparatus of Figure 4, however, the color sequence is *r, g, b, r, g, b* etc., as contrasted with the *r, g, b, g, r, g, b* sequence shown in Figures 1–3. The reproducing system of Figure 4 includes a color-selection barrier 36 including a series of conductive elements 37 which extend in a regular pattern substantially parallel to target area strips 34 Target 33 is also preferably provided with a conductive backing film 35 and the target may be maintained at a substantially different potential from color-selection barrier 36.

In the image reproducing system of Figure 4, three effective electron sources (not shown) are provided so that three separate effective electron beams impinge upon target 33 from substantially different angles as indicated by broken lines C, D and E. Color selection is achieved by the masking effect of barrier 36, which restricts beam C so that it can impinge only upon the color targret areas of group *b*. Similarly, beams D and E are restricted so that they bombard only color groups *g* and *r* respectively. Three separate electron guns may be employed to generate beams C, D and E, or a single electron beam may be deflected to three different points of apparent origin on a time-sequential basis in accordance with techniques known in the art to provide the three effective electron beams. In this image reproducing system, as in that of Figures 1–3, the color-selection barrier may be maintained at a substantially different potential from the target so that the electron beams are focused as they traverse the space between barrier 36 and target 33, thus permitting the use of barrier elements 37 of relatively small size to avoid imposing undesirable limitations on the amount of light output which may be obtained from the system. For further details as to the operation of this type of image reproducer, reference may be made to French Patent No. 866,065, filed July 11, 1939, and delivered March 31, 1941.

In the image reproducers of Figures 1–3 and 4, objectionable moiré or beat patterns often appear in the reproduced image. The moiré appears to the observer as a series of lines extending across the image and results from a beat between the scanning lines of the image and the individual elements of the color selection barrier. Two fundamental beat frequencies may be present, one frequency being determined by the differences in repetition frequency or spacing of the scanning lines and the barrier elements, the other beat frequency being equal to their sum; however, for an image reproducer of customary dimensions, the sum beat frequency is not noticeable and may be ignored. It has been thought that the moiré problem could be solved most readily by defocusing the electron beam of the image reproducer so that the scanning lines overlap to a considerable extent or perhaps by reducing the width of the color selection barrier elements so that they intercept only an extremely small percentage of the electron beam. Defocusing the beam does eliminate the moiré, but entails a substantial and undesirable reduction in definition in the reproduced image. Reducing the size of the barrier elements, on the other hand, does not present a general solution to the problem, as will be indicated in connection with Figures 5A and 5B. It has been discovered, however, that, contrary to the commonly accepted understanding in the art and in accordance with the invention, moiré effects may be eliminated in image reproducers which employ color selection barrier elements of finite, practical width without defocusing the electron beam by establishing a preferred relationship between the center-to-center spacing or pitch of the scanning lines, the center-to-center spacing or pitch of the color selection barrier elements, and the width of the barrier elements. The term "width" as used in conjunction with the barrier elements refers to the dimension of an individual barrier element measured in a direction perpendicular to the scanning lines.

Figure 5A:
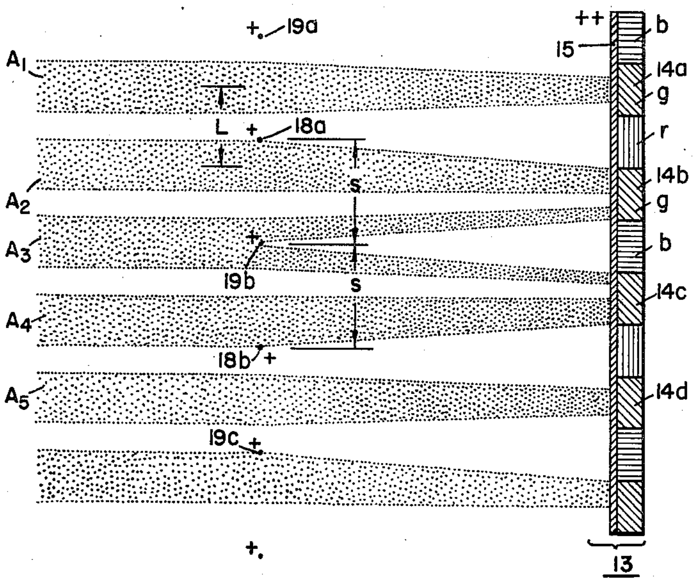
Figure 5A is a greatly enlarged sectional view of a portion of a particular color television image reproducer target structure showing distribution of the electron beam across the target.
Figure 6A:
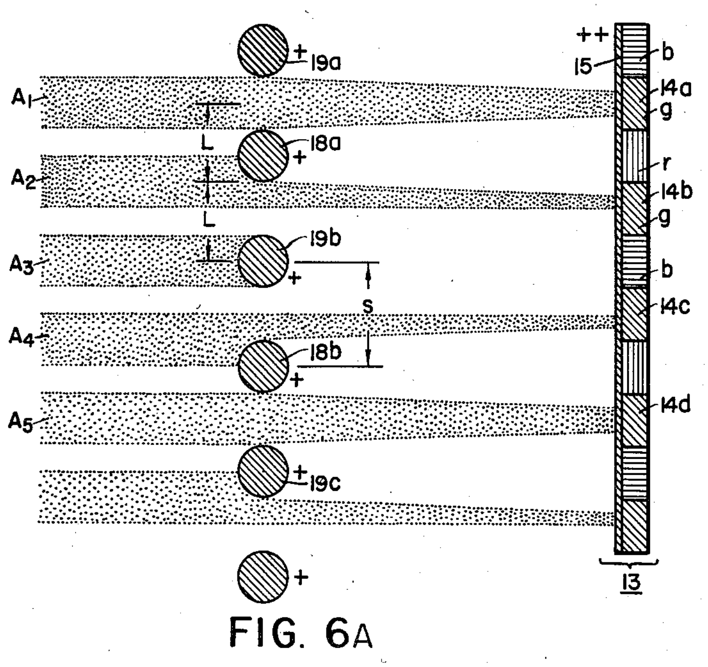
Figures 6A and 6B are essentially similar to Figures 5A and 5B respectively except that the dimensions of a portion of the target structure are materially different.
Figure 7A:
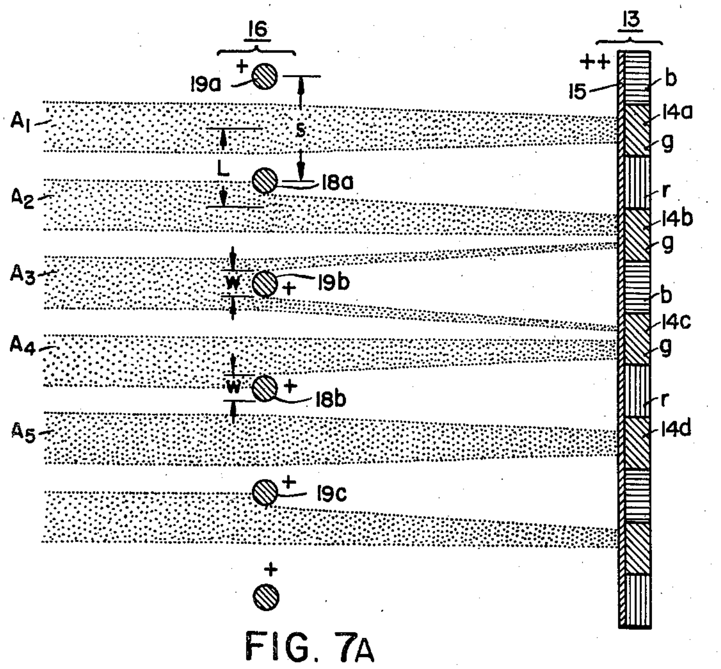
Figures 7A and 7B correspond to Figures 5A and 5B respectively but illustrate a target structure constructed in accordance with the invention.

Figures 5A, 6A, and 7A each comprise a greatly enlarged schematic cross-sectional view of a portion of the composite target structure of any image reproducer such as that described in connection with Figures 1–3, with the electron beam distribution during each of several sequentially developed scanning lines of a common image field indicated in shaded outline. In each of these figures, the center-to-center spacing or pitch S between adjacent conductive elements 18, 19 of barrier 16 is taken as unity, whereas the center-to-center spacing or pitch L of the scanning lines of the picture raster, taken in the plane of the barrier, is 0.75 S. The direction of line scansion is normal to the plane of the drawing. For convenience, the focusing action of the electrostatic lens field resulting from the potential difference between target 13 and barrier 16 is assumed to effect a 2:1 reduction in the beam size, and the color-selection barrier elements 18 and 19 are at equal potentials so that the electron beam impinges upon color target areas of group *g*. For ease in understanding, a well collimated electron beam of constant intensity, corresponding to the operating condition for reproducing a desaturated primary color field, is assumed; intensity modulation of the electron beam in accordance with the picture components of the received signal may vary the quantitative but not the qualitative aspects of image reproducer operation.

In Figure 5A, the barrier elements are illustrated as having negligible cross-sectional area, so that they do not intercept any appreciable portion of the electron beam, a condition which is obviously unrealizable in actual practice but is considered for the purpose of facilitating an understanding of the present invention. On the first scanning line $A_1$, the beam is centered between conductive elements 19*a* and 18*a* so that it does not impinge upon any of the barrier elements and the full beam bombards color target area 14*a*. In the next scanning line $A_2$, since only a negligible portion of the electron beam is intercepted by barrier element 18*a*, the full beam bombards target area 14*b*. On the third scanning line $A_3$, the beam is equally divided by barrier element 19*b* so that one-half of the beam impinges upon each of target areas 14*b* and 14*c*; thus, during scansion of a particular image field, color target area 14*b* is excited by fifty percent more beam current than area 14*a*. Target area 14*c* is similarly over-excited as compared to area 14*a*, since the full beam current impinges upon area 14*c* during the next scanning line $A_4$. The cycle is complete with scanning line $A_5$, which is substantially identical with line $A_1$ and results in the bombardment of area 14*d* by the full beam current. Thus the different areas of target 13 are bombarded by unequal average beam currents.

Figure 5B:
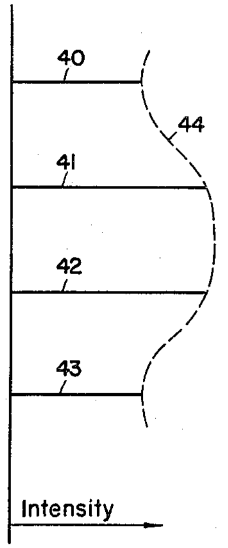
Figure 5B is an explanatory diagram illustrating the light intensity pattern produced by the target of Figure 5A.

Figure 5B illustrates the light intensity pattern produced across the face of the target in Figure 5A. The intensity of the light emitted by target strip 14*a* is indicated by line 40, and the greatly increased intensity of the light from strips 14*b* and 14*c* are represented by longer lines 41 and 42 respectively; the light from strip 14*d* is indicated by line 43, which is equal in length to line 40. In a practical image reproducer, the target strips are extremely small in width, so that the overall effect is integrated by the eye of the observer as indicated by dash line 44. However, the integrated pattern is considerably coarser than the target strip pattern and the differences in light intensity are quite pronounced so that an overall line pattern is imposed upon the image. It is this particular moiré or beat pattern which is eliminated in reproducers constructed in accordance with the invention.

Figure 6A is identical wth Figure 5A except that the diameter or width W of the color-selection barrier elements is of substantial size. In the first scanning line $A_1$ of this figure the entire beam again passes through color-selection barrier 16 and impinges upon target area 14*a*. In the second scanning line $A_2$, approximately one-half of the electron beam is intercepted by barrier element 18*a* so that only one-half of the beam current reaches target area 14*b*. The beam current during scanning line $A_3$ is completely intercepted by barrier element 19*b* so that it does not contribute to the picture and cannot provide any energy toward the bombardment of area 14*b* to make up for that intercepted by element 18*a* during scansion line $A_2$. During the next scanning line $A_4$, one-half of the beam current is intercepted by barrier element 18*b* so that only one-half the available beam current reaches area 14*c*. As in the previous example, the next succeeding line $A_5$ passes completely through the barrier so that target area 14*d* is bombarded by the full beam current.

Figure 6B:
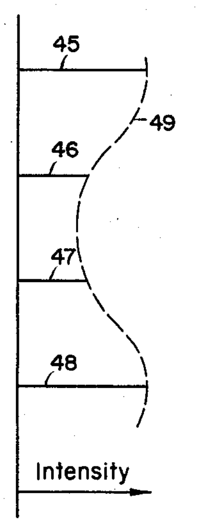

The light intensity distribution across the face of the target in Figure 6A is illustrated in Figure 6B. The relative light intensities produced at target strips 14*a*, 14*b*, 14*c* and 14*d* are indicated by lines 45, 46, 47 and 48 respectively. The overall visual effect, as integrated by the eyes of an observer, is shown by dash line 49. As in the structure described in connection with Figures 5A and 5B, a coarse and highly objectionable line pattern is produced in the image, due to the fact that the light intensities of strips 14*b* and 14*c*, as shown by lines 46 and 47, are only approximately one-half as great as those of adjacent strips 14*a* and 14*d*, indicated by lines 45 and 48.

Figure 7A is in many respects essentially similar to Figures 5A and 6A; however, the target structure of Figure 7A is constructed in accordance with the invention. On the first scanning line $A_1$, the electron beam is again centered between barrier elements 19*a* and 18*a* so that it does not impinge upon either of the barrier elements and the entire beam bombards target strip 14*a*. On the next line $A_2$, one-fourth of the electron beam impinges on and is collected by barrier element 18*a*, so that three-fourths of the beam bombards target strip 14*b* during this scanning line. However, on the next scanning line $A_3$, one-half of the beam is intercepted by barrier element 19*b* and the portion of the beam which passes through the barrier is equally divided between the target areas 14*b* and 14*c*, each receiving one-fourth of the total available beam current. The next scanning line $A_4$ is the inverse of line $A_2$; grid element 18*b* intercepts one-fourth of the available beam current and three-fourths impinges upon area 14*c*. The cycle is completed with scanning line $A_5$, which is again centered between the two color-selection barrier elements 18*b* and 19*c* so that target strip 14*d* receives the full beam current. Thus, each of the phosphors receives equal average beam current excitation during scansion of the picture raster and, consequently, no beat frequency patterns are introduced into the reproduced image.

Figure 7B:
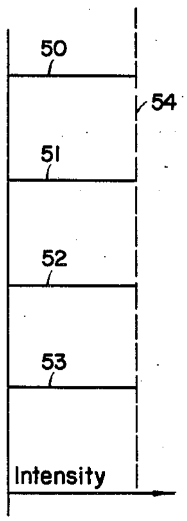

The relative light intensity produced by each of the target strips is illustrated in Figure 7B, in which lines 50, 51, 52 and 53 indicate the light intensity developed at target strips 14*a*, 14*b*, 14*c* and 14*d* respectively and the integrated overall effect upon an observer is shown by dash line 54. Bacause the relative intensity of the light emitted by the various phosphor strips is equal for a constant beam current, no beat frequency pattern is introduced into the image by virtue of the tube structure, and fields of constant color may be reproduced accurately. This effect is achieved only if the width W of the individual barrier elements 18 and 19 is made equal to the difference between the barrier element pitch S and the pitch or center-to-center spacing L of the scanning lines in the plane of the barrier elements; in other words, the conductive elements of the color selection barrier must be arranged in a regular pattern having a predetermined pitch S which is equal to the sum of the scanning line pitch L and the individual barrier element width W.

The particular tube structure shown in Figures 5–7 is illustrative only; the same considerations apply with equal force in a tube of the general type illustrated in Figure 4. Of course, the invention is not restricted to color image reproducers, since the same moiré difficulties may be present in any tube in which a barrier such as grid 16 of Figure 1 is employed, regardless of the type of luminescent target used. For example, it may be desirable to employ a target structure comprising a multitude of target areas which emit light polarized in different directions in order to achieve multi-dimensional or other special visual effects; the advantages of the invention are equally important and desirable in this type of image reproducer.

The number of scanning lines of the image raster is fixed by the transmission standards, so that for a target of given area the scanning line pitch L cannot be varied for individual image reproducers. Thus, in order to achieve the advantages of the invention, it is necessary that the image reproducer be constructed so that barrier element pitch S and barrier element width W bear the proper relation to line pitch L according to the formula $S=W+L$. In all other respects, image reproducers embodying the invention may be entirely conventional, and there is no requirement for additional electrodes or other structure within the image reproducer or for added circuitry associated with the picture tube.

While a particular embodiment of the present invention has been shown and described, it is apparent that changes and modifications may be made without departing from the invention in its broader aspects. The aim of the appended claims, therefore, is to cover all such changes and modifications as fall within the true spirit and scope of the invention.

I claim:

1. A television image reproducer of the type in which an electron beam is deflected across a luminescent target in an image raster comprising a predetermined number of scanning lines comprising: a luminescent target; means including an electron gun for generating and projecting a beam of electrons to bombard said target; and a barrier comprising a multiplicity of elements individually of predetermined width disposed intermediate said target and said electron gun in spaced relation to said target, said barrier elements having a predetermined pitch equal to the sum of the scanning line pitch at said barrier and said barrier element width.

2. A television image reproducer of the type in which an electron beam is deflected across a luminescent target in an image raster comprising a predetermined number of scanning lines comprising: a luminescent target including a plurality of groups of elemental target areas interspersed throughout a predetermined target area in a regular pattern, each of said target area groups having a different radiation characteristic in response to electron bombardment; means including an electron gun for generating and projecting a beam of electrons to bombard said target; and a barrier comprising a multiplicity of elements individually of predetermined width disposed intermediate said target and said electron gun in spaced relation to said target, said barrier elements having a predetermined pitch equal to the sum of the scanning line pitch at said barrier and said barrier element width.

3. A color television image reproducer of the type in which an electron beam is deflected across a luminescent target in an image raster comprising a predetermined number of scanning lines comprising: a luminescent color target including a plurality of groups of elemental target areas interspersed throughout a predetermined target area in a regular pattern, each of said target area groups having a different color radiation characteristic in response to electron bombardment; means including an electron gun for generating and projecting a beam of electrons to bombard said target; and a color-selection barrier comprising a multipilicity of elements individually of predetermined width disposed intermediate said target and said electron gun in spaced relation to said target, said barrier elements having a predetermined pitch equal to the sum of the scanning line pitch at said barrier and said barrier element width.

4. A color television image reproducer of the type in which an electron beam is deflected across a luminescent target in an image raster comprising a predetermined number of scanning lines comprising: a luminescent color target including a plurality of groups of elemental target strips interspersed throughout a predetermined target area in a regular pattern, each of said target strip groups having a different color radiation characteristic in response to electron bombardment; means including an electron gun for generating and projecting a beam of electrons to bombard said target; and a color-selection barrier comprising a multiplicity of elongated conductive elements individually of preselected width disposed intermediate said target and said electron gun in spaced relation to said target and parallel to said target strips, said barrier elements having a predetermined pitch equal to the sum of the scanning line pitch at said barrier and said barrier element width.

5. A television image reproducer of the type in which an electron beam is deflected across a luminescent target in an image raster comprising a predetermined number of scanning lines comprising: a luminescent target; means for maintaining said luminescent target at a predetermined average potential; means including an electron gun for generating and projecting a beam of electrons to bombard said target; a barrier comprising a multiplicity of conductive elements individually of predetermined width disposed intermediate said target and said electron gun in spaced relation to said target, said barrier elements having a predetermined pitch equal to the sum of the scanning line pitch at said barrier and said barrier element width; and means for maintaining said barrier at a predetermined average potential different from said average potential of said luminescent target to establish an electrostatic lens field for said beam.

6. A color television image reproducer comprising: a luminescent color target including a plurality of groups of elemental target areas interspersed throughout a predetermined target area in a regular pattern, each of said target area groups having a different color radiation characteristic in response to electron bombardment; means for maintaining said color target at a predetermined average potential; an electron gun for projecting a beam of electrons to bombard said target; means for deflecting said electron beam across said target area in a raster comprising a predetermined number of scanning lines; a color-selection barrier comprising a multiplicity of conductive elements individually of predetermined width disposed in spaced relationship to said color target and arranged in a regular pattern having a predetermined pitch equal to the sum of the scanning line pitch at said barrier and said barrier element width; and means for maintaining said color-selection barrier at a predetermined average potential different from said average potential of said color target to establish an electrostatic lens field for said beam.

7. A color television image reproducer comprising: a luminescent color target including a plurality of groups of elemental target areas interspersed throughout a predetermined target area in a regular pattern, each of said target area groups having a different color radiation characteristic in response to electron bombardment; means for maintaining said color target at a predetermined average potential; an electron gun for projecting a beam of electrons to bombard said target; means for deflecting said electron beam across said target area in a raster comprising a predetermined number of scanning lines of preselected pitch; a color-selection barrier comprising two color-selection grids, each including a multiplicity of conductive elements individually of preselected width, disposed in substantially coplanar relationship and spaced from said color target with said conductive elements of said two grids arranged in a regular pattern having a predetermined pitch equal to the sum of the scanning line pitch at said barrier and said barrier element width; and means for maintaining said color-selection barrier at a predetermined average potential different from said average potential of said color target to establish an electrostatic lens field for said beam.

References Cited in the file of this patent

UNITED STATES PATENTS

| | | |
|---|---|---|
| 2,595,548 | Schroeder | May 6, 1952 |
| 2,612,614 | Amdursky | Sept. 30, 1952 |
| 2,643,352 | Parker | June 23, 1953 |
| 2,660,684 | Parker | Nov. 24, 1953 |
| 2,728,024 | Ramberg | Dec. 20, 1955 |